Feb. 5, 1946.    C. S. McCHESNEY    2,394,465
APPARATUS FOR PLACING BEADS ON TIRE CARCASSES
Original Filed Oct. 3, 1942    4 Sheets-Sheet 4

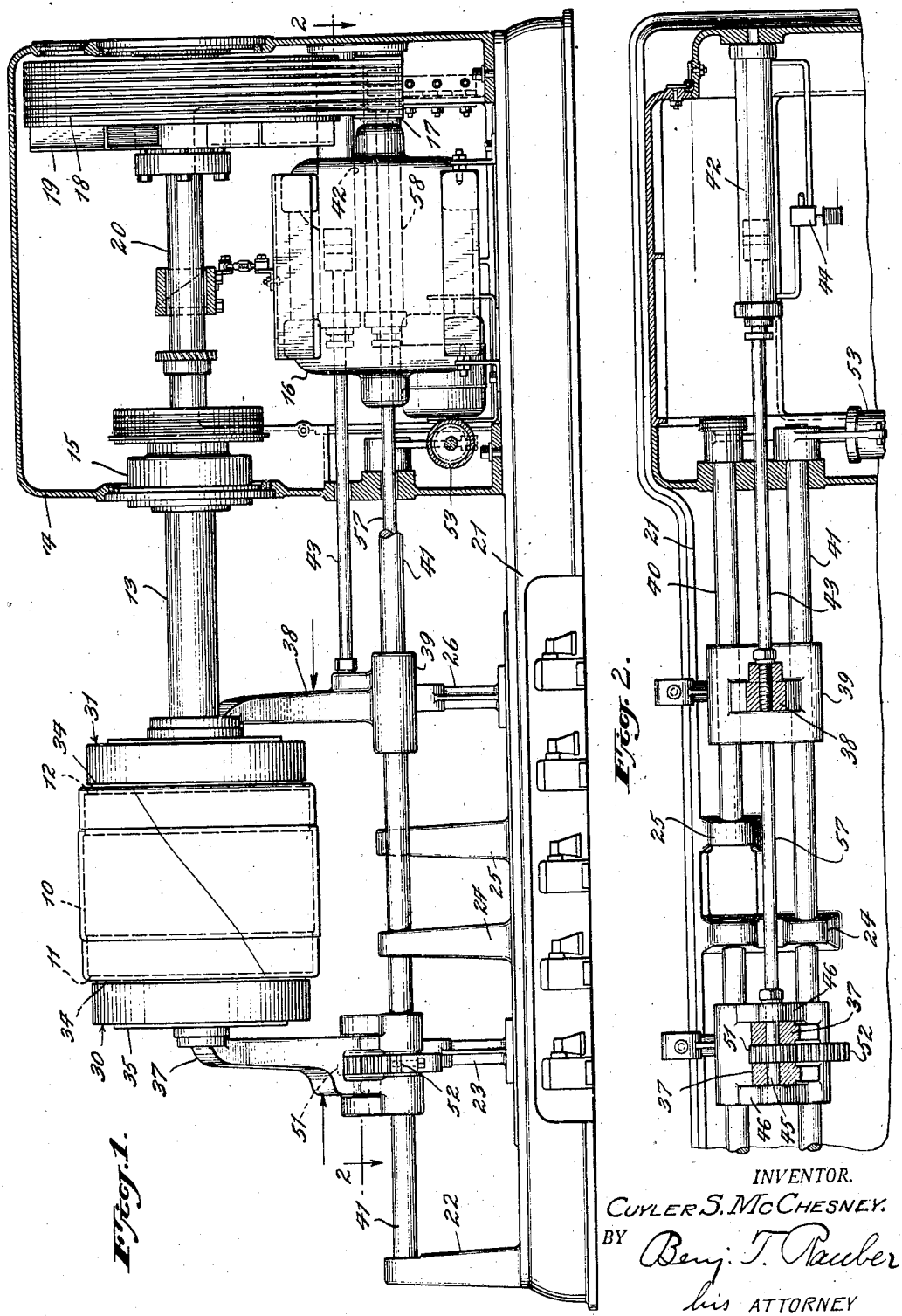

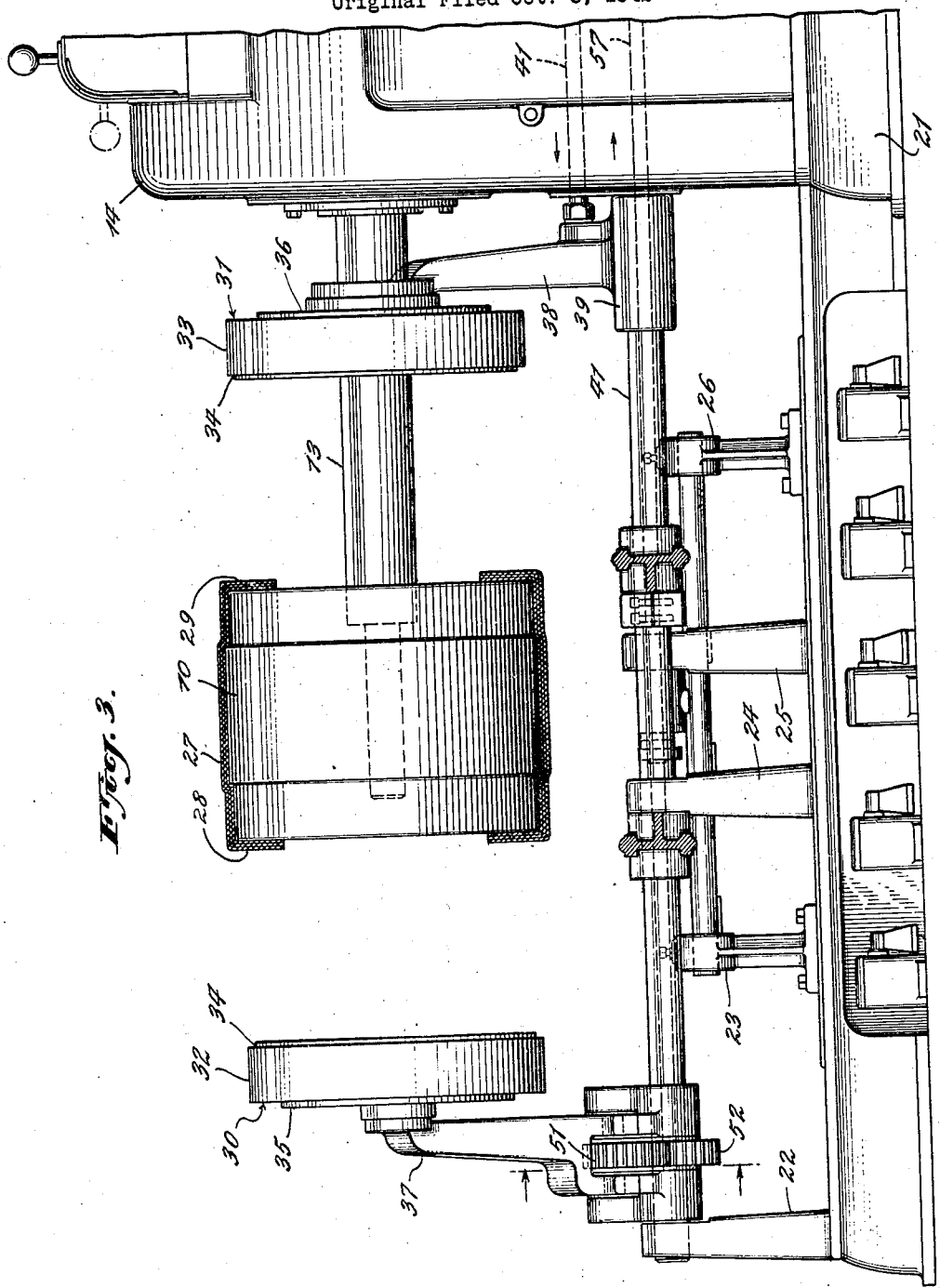

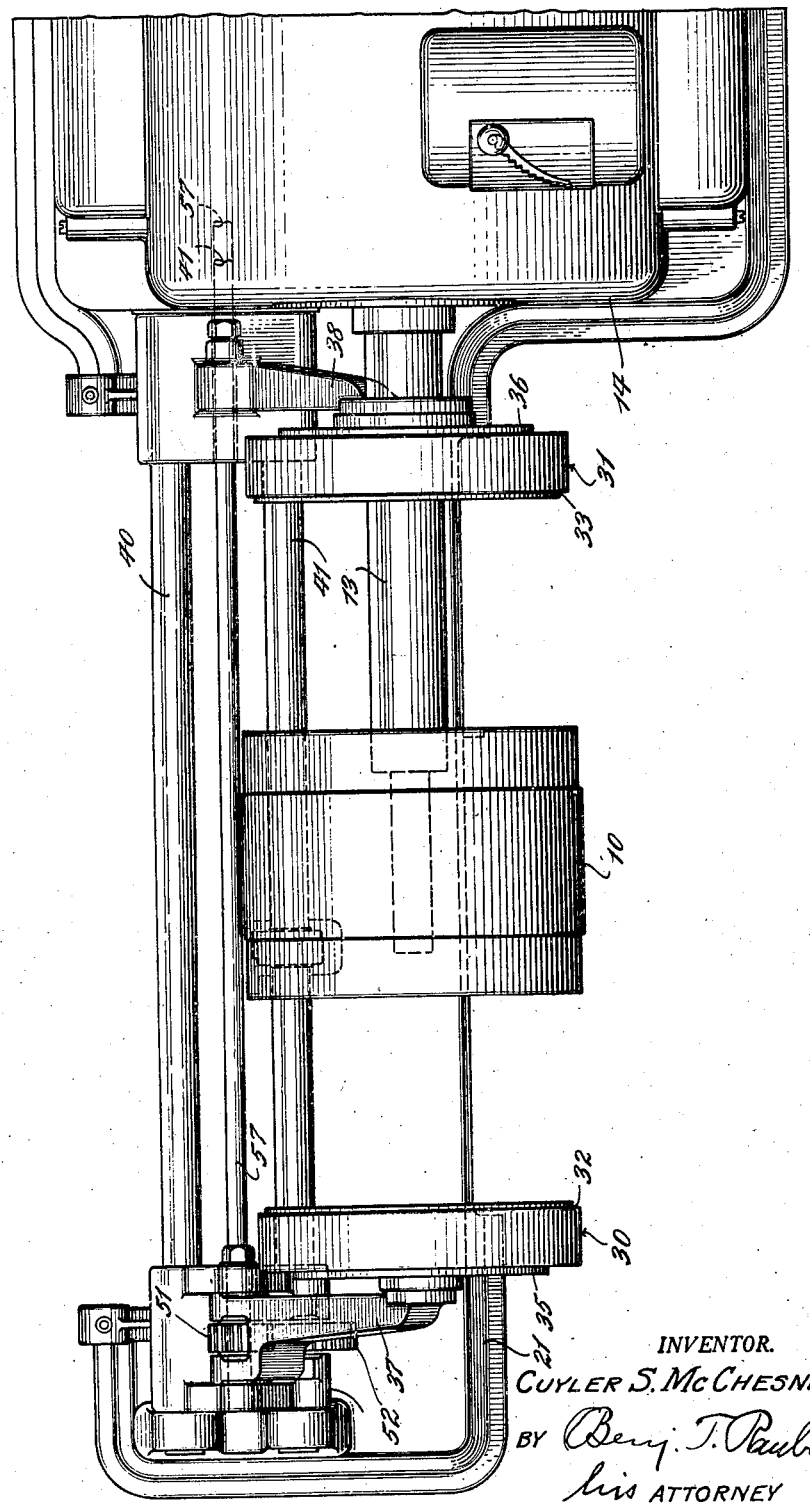

INVENTOR.
CUYLER S. McCHESNEY.
BY
his ATTORNEY.

Patented Feb. 5, 1946

2,394,465

UNITED STATES PATENT OFFICE 2,394,465

APPARATUS FOR PLACING BEADS ON TIRE CARCASSES

Cuyler S. McChesney, Kenmore, N. Y., assignor to Dunlop Tire and Rubber Corporation, Buffalo, N. Y., a corporation of New York Original application October 3, 1942, Serial No. 460,705. Divided and this application November 18, 1944, Serial No. 564,163

2 Claims. (Cl. 154—9)

This application is a division of my co-pending application Serial No. 460,705, filed October 3, 1942, for a Tire building machine.

In the machine of my co-pending application the various tire elements, such as the plies, the bead wires, chafer and breaker strips and tread are all applied in proper succession onto a rotating drum and there united into a tire carcass which is later formed and molded in a vulcanising apparatus.

In the machine of my co-pending application the rotating forming drum is mounted on a rotating shaft projecting from a housing which contains a motor for rotating the drum and means for controlling the application of the various tire elements.

In the invention of my present application means are provided for applying the beads to plies on the drum during the building of the carcass and for centering the beads accurately on that portion of the plies that are turned over the ends of the drum. Inasmuch as the completed tire carcass must be removed endwise from the drum the bead placing mechanism must be swung out of alignment so as not to interfere with the removal of the completed carcass.

In my present invention one of the bead placing means is mounted concentrically on the shaft supporting the drum so that a bead may be placed in position thereon before beginning the building of the tire and while the drum is collapsed. The opposite bead is placed on a holding means spaced from the opposite end of the drum and mounted in such a way that it may be swung to one side during the removal of a completed tire carcass and thereafter swung back into alignment with the drum during or prior to the application of the tire elements thereto.

The various features of my invention are illustrated by way of example in the accompanying drawings in which Fig. 1 is a front elevation partly in section of a tire building machine of said co-pending application Serial No. 460,705, and of the bead applying means of the present invention;

Fig. 2 is a horizontal section taken on line 2—2 of Fig. 1;

Fig. 3 is a front elevation on a larger scale than that of Fig. 1 showing plies of rubberized fabric applied to the drum in position to receive the beads;

Fig. 4 is a plan view of the mechanism shown in Fig. 3;

Figure 5:
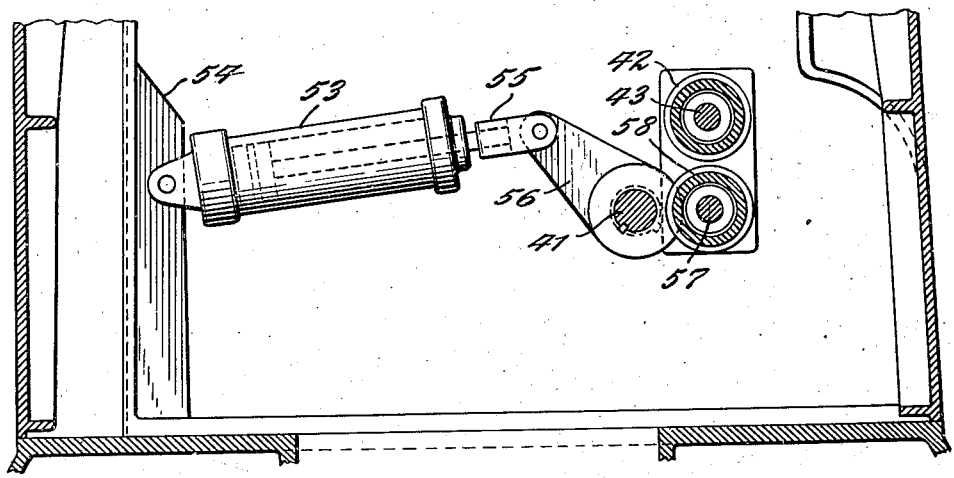
Fig. 5 is an end view taken from the left of Fig. 3 showing the drum and one of the bead applying means.

In the embodiment of the invention shown in the accompanying drawings a forming drum 10 having flat end surfaces 11 and 12 is supported on a shaft 13 projecting from a housing 14 in which the shaft is mounted on suitable bearings such as 15. The shaft 13 may be driven forwardly or reversely by means of a motor 16 having a pulley 17 which is connected by a belt 18 to a pulley 19 mounted on a part 20 of the shaft 13 within the housing 14. The housing 14 is preferably mounted on a base 21 which projects to one side of the housing and on which are mounted upright supports 22, 23, 24, 25 and 26 for supporting various actuating mechanisms of the bead placing device.

The apparatus in the accompanying drawings is illustrated in the formation of a four-ply tire but it will be understood that it may be applied to the building of tires of any desired number of plies.

After two plies 27 have been applied to the forming drum and stitched together they form a cylinder with the ends of the plies projecting beyond the edges of the drum. The projecting ends of the plies are then turned inwardly flat against the face of the drum, as indicated at 28 and 29, Fig. 3, in position to receive the bead wires or beads.

The beads are mounted on bead rings 30 and 31, Figs. 1, 3 and 4. The bead rings 30 and 31 have annular flanges 32 and 33 respectively, projecting toward the drum 10 and each has a groove 34 at its outer peripheral edge or corner to receive its respective bead. The rings are supported on spiders 35 and 36 which are in turn mounted on the upper ends of supporting brackets 37 and 38. Each of these brackets is slidably mounted on supporting rails or shafts whereby they may be moved toward and from the ends 11 and 12 of the drum 10.

The bracket 38 is in fixed position relative to the axis of the drum 10 so as to hold the flange 33 and groove 34 centered co-axially with the drum. The lower part of the bracket 38 is widened to an integral base 39 through which pass supporting rods or shafts 40 and 41. For convenience these rods may be positioned slightly back of the vertical plane of the axis of the drum 10 and are preferably in a horizontal plane.

The rod 40, which is hollow, is supported on and between the standard 25 and the wall of the housing 14, Figs. 1, 2 and 3. It is, or may be, a non-rotating rod rigidly secured in its supports. The rod 41 is longer than rod 40 and extends from within the motor housing 14 through the standard 24 to the standard 22.

Figure 6:
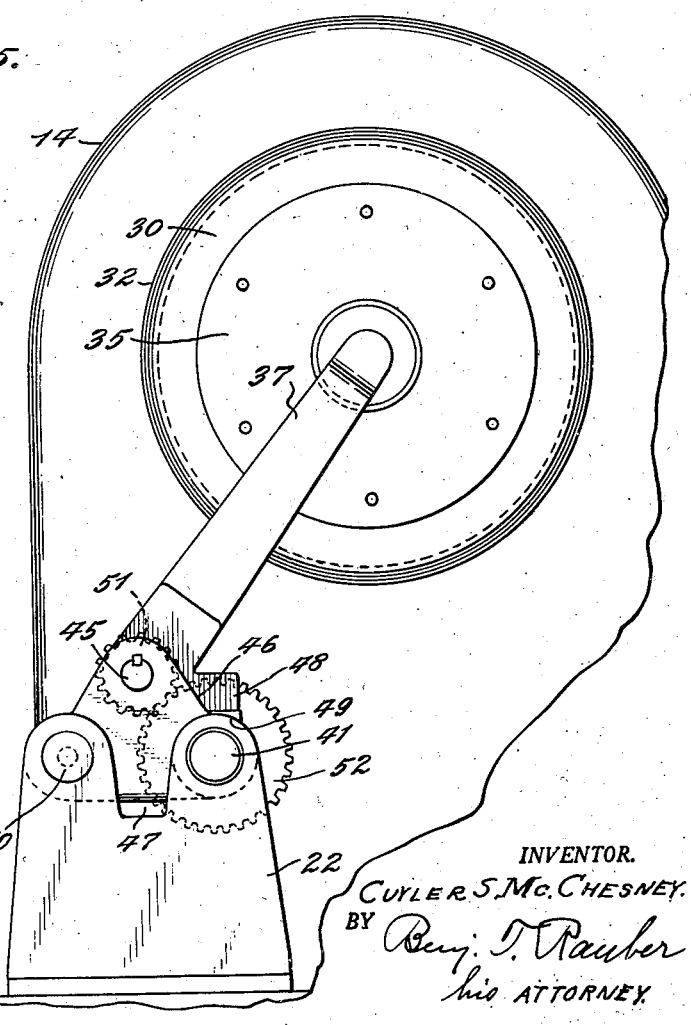
Fig. 6 is a detail of means for swinging one of the bead placing members taken on line 6—6 of Fig. 2.

The bracket 38 and its base 39 are slidable longitudinally on the rods 40 and 41 and are actuated by a pneumatically or hydraulically operated piston and cylinder 42 to which the bracket 38 is connected by a sliding piston rod 43, Figs. 1, 2 and 6.

The bead ring 31 is supplied with a bead before the plies of fabric are wrapped on the drum and while the drum is collapsed.

When the bead is to be applied to the drum, fluid is admitted through an electromagnetic valve 44, Fig. 2, to the right of the cylinder 42 to drive the piston and piston rod 43 to the left and bring the bead ring 31 tightly against the end of the drum 10 and then, reversely, to the left end of the cylinder to move the arm 38 away from the drum.

The arm 37 is pivotally supported so that it may swing into co-axial position relative to the drum 10 and of co-axial position a sufficient distance to permit a completed carcass or tire to be removed longitudinally from the drum when the latter is collapsed. For this purpose the arm 37 is keyed at its lower end on a shaft 45, Fig. 6, which is pivotally supported at its ends between a pair of ears 46 extending upwardly from a base 47. To position the arm 37 with the ring 32 centered accurately on the axis of the drum 10 the lower part of the arm 37 is provided with a side extension 48 which, as shown in Fig. 6, rests on a flat support 49 of the base 47 when the arm is moved to coaxial position.

The base 47 is slidably supported on the rod or shaft 41 and a parallel shaft 50, Figs. 1, 4 and 5, which is supported between the standard 22 and the standard 24. The arm 37 is rocked to and from its co-axial position by means of a pinion 51 keyed on the rock shaft 45 and made fast to the arm 37 and meshing with a gear or half gear 52 slidably mounted on the shaft 41 with a sliding key to permit the base 47 and arm 37 to slide longitudinally of the shaft. To fix and secure the gears 51 and 52 in proper engagement or mesh the lower end of the arm 37 is bifurcated to receive the gear 51 and the sliding base 46 is bifurcated to receive the gear 52.

When a bead is to be applied to the assembled plies on the drum it may be mounted in the groove 34 of the bead ring 32 while the latter is tilted out of alignment with the axis of the drum 10.

To apply it to the tire structure built up on the drum the shaft 41 is rocked to swing the arm forwardly or clockwise, as viewed in Fig. 6, until the projection 48 rests upon the flat support 49 of the base 46 and is thus in alignment or co-axial with the drum 10.

The shaft 41 is rocked by means of a pneumatic or hydraulically operated piston and cylinder 53, Figs. 2 and 5, pivotally mounted at one end on a supporting rib 54 of the housing 14 and reciprocating a piston stem 55 articulated to the free end of a lever 56 keyed onto the inner end of the shaft 41.

When pressure fluid is admitted to the outer end of the cylinder 53 it rocks the arm 56 and shaft 41 counterclockwise, Fig. 5, and swings the arm 37 out of alignment with the drum 10. Conversely, when fluid is admitted to the opposite, or pivoted, end of the cylinder 53 the arm 37 is swung over clockwise until projection 48 rests on the flat surface 49 whereupon the base 47 may slide lengthwise of the shafts 41 and 50 to bring the bead ring tightly against the end of the drum 10. For this purpose the base or carriage 46 is secured to a piston stem 57, Figs. 1-4, which extends through the wall of the housing 14 and into a cylinder 58 mounted immediately beneath the cylinder 42.

The end of the piston rod 57 in the cylinder 58 is provided with a piston similar to that of piston rod 43 so that when pressure fluid is admitted to the left of cylinder 58 the bead ring will be moved into engagement with the drum 10, and when pressure fluid is admitted to the opposite end of the cylinder 58 the bead ring will be pushed away from the drum 10 and then may be tilted to one side.

When a tire carcass is to be built the respective beads are mounted on the bead rings 30 and 31 and in the flanges 32 and 33 respectively thereof. The beads are generally covered with a strip of unvulcanized rubber fabric and are, therefore, sufficiently tacky to adhere securely to the bead rings. When they are to be applied to the tire fabrics the rings are moved by their respective pneumatically operated pistons to bring the bead rings and beads against the tire fabric that has been turned over the end faces of the drums and press the beads tightly against this fabric. The fabric is of unvulcanized rubber and, therefore, has a tacky surface to which the beads adhere more firmly than they do to the bead rings. When the bead rings are withdrawn from the end faces of the drum, therefore, the beads are left on the drum accurately centered thereon and held securely by the adhesion of the tacky surfaces of the tire fabric and of the beads. Then the part of the tire fabric projecting inwardly beyond the beads toward the center of the drum may be turned outwardly and around the beads preparatory to applying additional layers of tire fabric to complete the tire.

What I claim is:

1. Apparatus for applying a bead to tire fabric on the end face of a forming drum which comprises a bead carrying element having means to position a bead in concentric relation to the end face of said drum, a rock arm supporting said element, means to slide said rock arm and element to and from said drum and to press said bead against the end face of said drum, a pinion secured to said rock arm and concentric with its axis of rotation, a gear meshing with said pinion, a crank actuating said gear, means to rock said crank arm, and stops to limit the rocking of said arm to and from coaxial position relative to said drum.

2. Apparatus for applying a bead to tire fabric on the end face of a forming drum which comprises a bead carrying element having means to position a bead in concentric relation to the end face of said drum, a rock arm supporting said element, means to slide said rock arm and element to and from said drum and to press said bead against the end face of said drum, a pinion secured to said rock arm and concentric with its axis of rotation, a gear meshing with said pinion, a crank actuating said gear, fluid pressure means to rock said crank arm, and stops to limit the rocking of said arm to and from coaxial position relative to said drum.

CUYLER S. McCHESNEY.